UNITED STATES PATENT OFFICE.

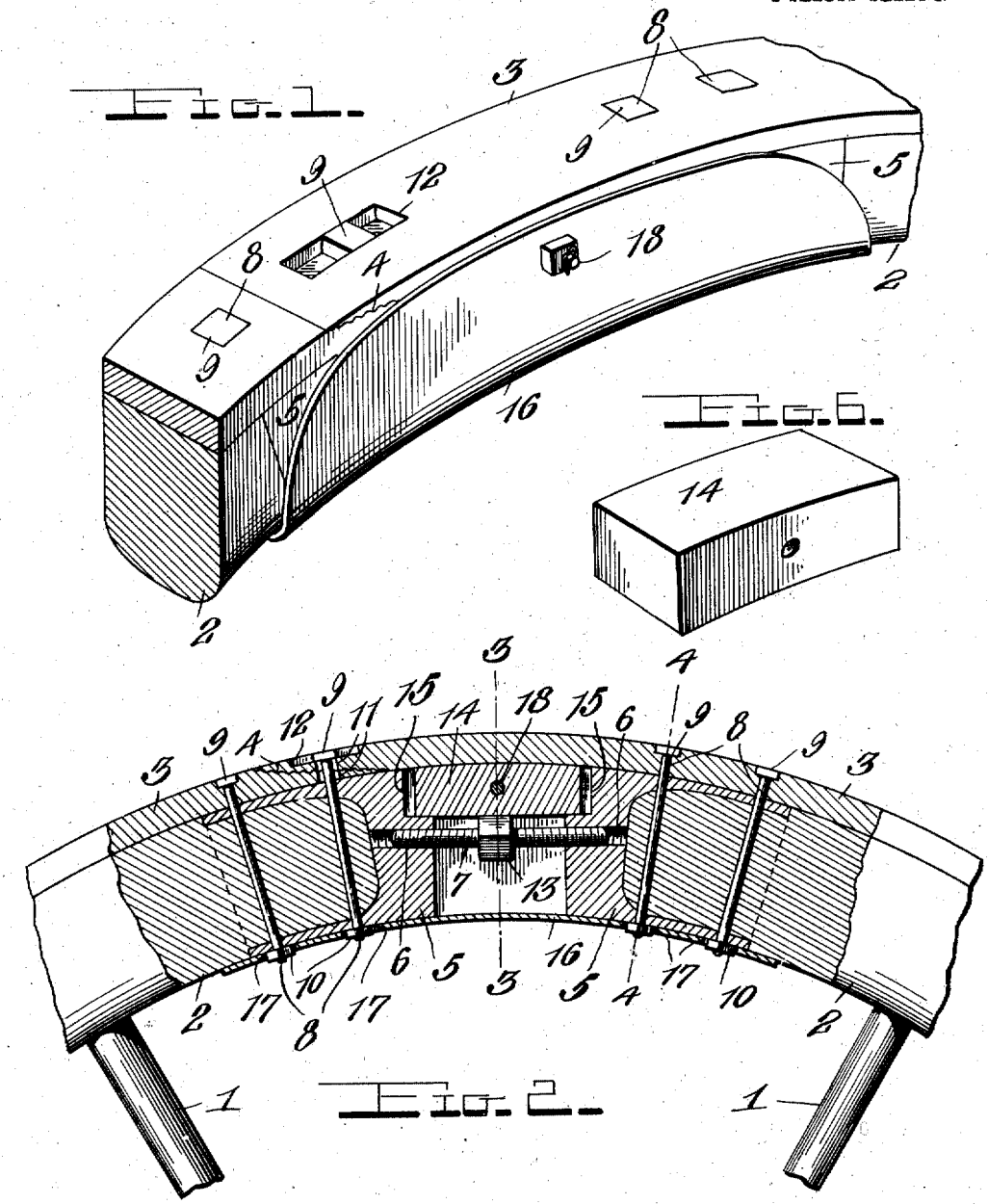

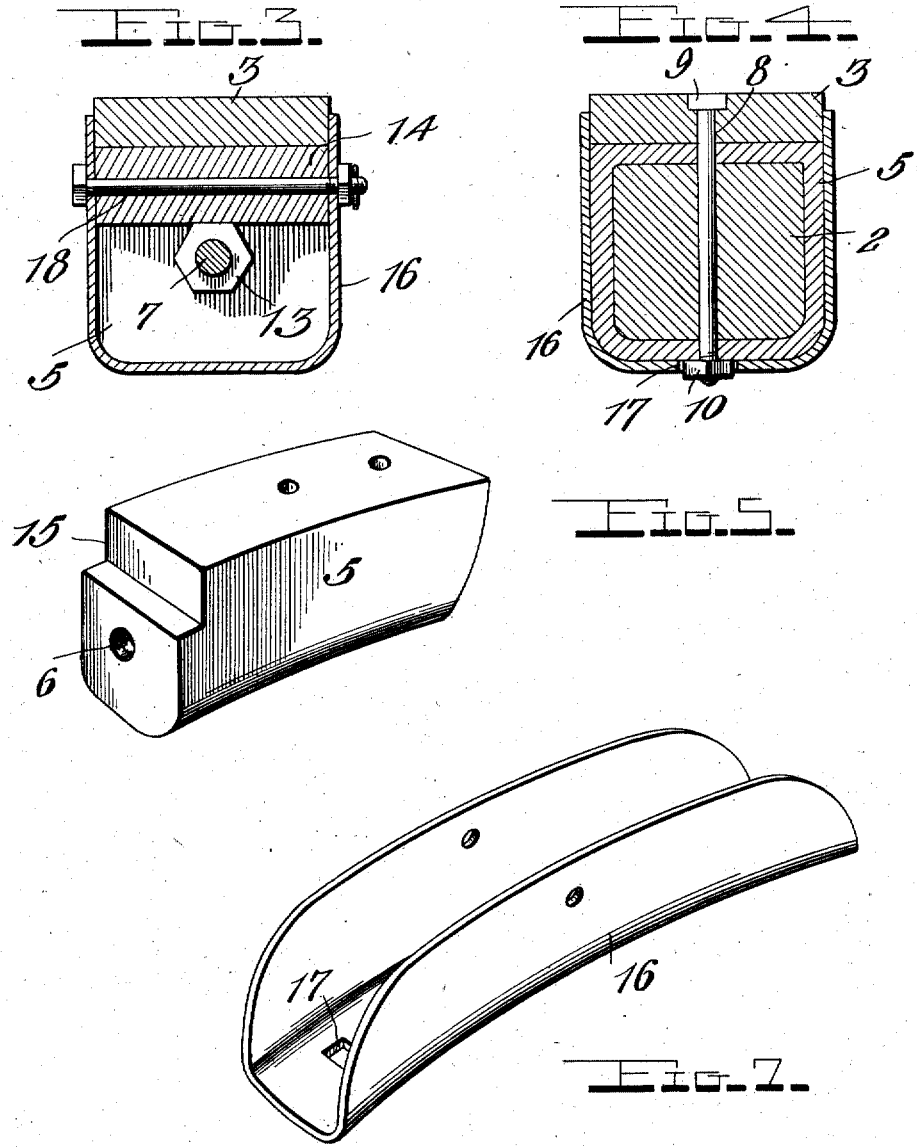

FRANK F. SLAY AND SQUIRE M. HENRY, OF GROOM, TEXAS.

TIRE-TIGHTENER.

985,073.  Specification of Letters Patent.  Patented Feb. 21, 1911.

Application filed April 9, 1910.  Serial No. 554,395.

*To all whom it may concern:*

Be it known that we, FRANK F. SLAY and SQUIRE M. HENRY, citizens of the United States, residing at Groom, in the county of Carson and State of Texas, have invented certain new and useful Improvements in Tire-Tighteners, of which the following is a specification, reference being had to the accompanying drawings.

This invention relates to improvements in tire tighteners of that class which are built in and form a part of a wheel.

The object of the invention is to provide a simple and practical device of this character which will enable the tire of a vehicle wheel or the like to be readily adjusted to tighten or loosen the tire, and which will not weaken the wheel.

With the above and other objects in view, the invention consists in the novel construction, combination and arrangement of parts, hereinafter fully described and claimed, and illustrated in the accompanying drawings in which:—

Figure 1 is a perspective view of a portion of a wheel showing the application of the invention; Fig. 2 is a longitudinal section through the parts shown in Fig. 1; Figs. 3 and 4 are cross sections taken respectively on lines 3—3 and 4—4 in Fig. 2; Fig. 5 is a perspective view of one of the felly caps; Fig. 6 is a similar view of the bracing and locking plug or block; and Fig. 7 is a similar view of the casing plate.

Referring more particularly to the drawings 1 denotes the spokes of a wheel, 2 the wooden felly and 3 the metallic tire. This tire has its ends cut diagonally and the beveled faces thus formed are overlapped so that the tread of the tire will present a smooth continuous surface. In order to cause these beveled, overlapped ends of the tire to effectively engage each other, they are corrugated as shown at 4.

The felly 2 at a point adjacent the overlapped ends of the tire, is divided and on the two sections thus formed are metal caps 5 containing threaded openings 6 which receive the right and left hand screw threaded ends of an adjusting bolt 7, the parts 5, 5, 7, thus serving as a turn buckle, whereby the felly may be expanded or contracted. The two caps 5 are retained on sections of the felly by radially arranged bolts 8 which also pass through the tire 3 and have their heads 9 countersunk in the outer surface of the tire, as shown in Fig. 2. The threaded inner ends of the bolts 8 are provided with clamping nuts 10. One of the bolts 8 passes through the overlapped ends of the tire and to permit of the adjustment of the tire, elongated openings or slots 11 are formed in said overlapped ends for the reception of said bolt, and an elongated recess 12 is formed in the outer surface of the tire for the head of said bolt.

At the center of the adjusting bolt 7 is formed a polygonal-shaped head 13 adapted to be readily engaged by a wrench or other tool for the purpose of turning the bolt, and in order to retain said bolt 7 in adjusted position a locking plug or block 14 of metal is inserted between the tire and the outermost flat face of the head 13 as shown. This block has its ends seated in transverse recesses 15 in the extremities of the felly caps 5 so that said block or plug not only serves to lock the bolt 7 but also to support the tire and strengthen the wheel.

In order to protect the above described parts and retain the block 14 in position and lock the nuts 10 of the bolts 9, a channeled or U-shaped casing member 16 is provided. This member is formed from a metal plate bent into U-form and having side portions which engage the side faces of the felly, felly caps and tire. The bottom or connecting portion of the casing plate 16 has openings 17 shaped to fit the nuts 10, whereby the latter will be held against rotation when the casing member is in position, as shown in Fig. 4. For the purpose of retaining the casing member 16 in position a bolt or similar fastening 18 is passed transversely through its side portions and through a transverse opening in the block 14, said bolt having a head at one end and a clamping nut and locking pin or key at its other end, as shown in Fig. 3.

In operation, when it is desired to tighten or loosen the tire 3 it is only necessary to remove the bolt 18, then remove the casing plate 16, then loosen the nut of the radial bolt 8 which passes through the slots 11 in the overlapped ends of the tire, and then remove the block 14 and turn the bolt 7. Owing to the right and left hand threaded ends of this bolt when it is turned in one direction the felly sections will be forced apart and hence the tire will be spread, and when turned in the opposite directions the felly sections will be drawn together and the tire thereby tightened. After the tire has been thus adjusted the parts are replaced so that the wheel will be strong and rigid at the point where the adjustment is effected.

Various changes in the form, proportion and arrangement of parts may be made within the spirit and scope of the invention.

Having thus described the invention, what is claimed is:

The combination of a tire band having oppositely beveled overlapped ends, formed with longitudinal slots, a felly arranged within the tire and having reduced ends, caps arranged on the said reduced ends of the felly and having oppositely disposed right and left hand threaded openings, and oppositely arranged seats, an adjusting bolt having oppositely threaded ends arranged in said openings in the caps, and formed on its center with an enlarged flat faced head, radially arranged bolts passing through the ends of the felly, the caps thereof, and the tire band, the heads on the outer ends of said bolts being set in the tire band, and the nuts on the threaded inner ends of said bolts being engaged with the inner sides of the caps, one of said bolts passing through the longitudinal slots in the beveled overlapped ends of the tire band, a locking block engaged with the inner side of the felly band and one of the flat faces of the head on said adjusting bolt, the ends of said block being engaged with the seats in the felly caps, said block having a transverse opening, a channeled casing member to extend over the end portions of the felly and the caps thereof, said casing member having its inner portion formed with openings to receive the nuts on said radial bolts, and the side portions of said casing member having openings to register with the transverse opening in the locking block, and a transverse fastening passing through the registering openings in the locking block and casing member.

In testimony whereof we hereunto affix our signatures in the presence of two witnesses.

FRANK F. SLAY.
SQUIRE M. HENRY.

Witnesses:
C. R. SLAY,
W. J. SLAY.